(12) United States Patent
Fan et al.

(10) Patent No.: US 9,329,805 B1
(45) Date of Patent: May 3, 2016

(54) HOST ORIENTED AUTOMATIC VERIFICATION OF BEST PRACTICES

(71) Applicant: EMC Corporation, Hopkinton, MA (US)

(72) Inventors: Xiaohua Fan, Shanghai (CN); Qin Tao, Hopkinton, MA (US); Yuanjie Wu, Shanghai (CN); Xiaogang Wang, Shanghai (CN); Dazhi Dong, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 183 days.

(21) Appl. No.: 14/139,927

(22) Filed: Dec. 24, 2013

(51) Int. Cl.
*G06F 13/00* (2006.01)
*G06F 3/06* (2006.01)
*G06F 12/06* (2006.01)

(52) U.S. Cl.
CPC ............... *G06F 3/0689* (2013.01); *G06F 3/06* (2013.01); *G06F 3/062* (2013.01); *G06F 3/0614* (2013.01); *G06F 3/0619* (2013.01); *G06F 3/0628* (2013.01); *G06F 3/0629* (2013.01); *G06F 3/0634* (2013.01); *G06F 3/0653* (2013.01); *G06F 3/0665* (2013.01); *G06F 3/0683* (2013.01); *G06F 12/0646* (2013.01)

(58) Field of Classification Search
None
See application file for complete search history.

(56) References Cited

U.S. PATENT DOCUMENTS

| | | | |
|---|---|---|---|
| 6,519,679 B2 | 2/2003 | Devireddy et al. | |
| 6,931,523 B1 | 8/2005 | Tomoson et al. | |
| 8,489,841 B1 | 7/2013 | Strecke et al. | |
| 2014/0272884 A1* | 9/2014 | Allen | G09B 7/04 434/322 |

* cited by examiner

*Primary Examiner* — Midys Rojas
(74) *Attorney, Agent, or Firm* — BainwoodHuang

(57) ABSTRACT

A method of verifying that a storage system is complying with best practices guide includes a software program running in host servers for determining the host server configuration parameters, and comparing the host server configuration to the storage system configuration. If a newly added best practices rule is found to be different than either the current configuration of the storage system or the host server configuration, then an alert may be generated, and sent to a storage system user or manager. In addition, a suggested change notice may be generated and transmitted to the storage system user or manager. There may also be a suggested change notice sent to the host server. Best practices rules may be stored in a data base and updated frequently.

19 Claims, 3 Drawing Sheets

HOST ORIENTED AUTOMATIC VERIFICATION OF BEST PRACTICES

BACKGROUND

Storage arrays in data storage systems are controlled by storage processors. Such storage processors process data access requests from hosts and perform maintenance operations on the storage arrays. For example, some storage processors execute a TRIM command on storage arrays having solid state disk (SSD) memory; the TRIM command removes unused space from such memory and makes that space available to the hosts and the storage processor.

In some arrangements, the configuration of such storage arrays and the storage processors controlling them is governed by best practices documentation. Best practices documentation includes a set of rules for configuring the storage processor and arrays in order to optimize various metrics, e.g., performance, power consumption, etc. Typically, best practices documentation is the result of an intricate engineering and testing effort and is ongoing in the face of changing environmental conditions.

Part of employing best practices documentation in configuring the elements of a data storage system, such as the storage arrays and processors, is verifying that such elements continue to operate under best practices rules, even as such rules change over time. Conventional best practices rules verification involves a person, typically a data storage system administrator, manually checking the configuration of the processors and arrays against rules in the most current best practices documentation. Personnel may perform such a check either on an as-needed basis, or periodically.

SUMMARY

Unfortunately, the above described method of verification of the use of best practices in storage processors has a number of deficiencies. For example, the best practice guide document is typically in paper or document form, and thus is read by a person. The TRIM command might appear in a best practices guide as a rule stating that "The operating system (OS) of any host that consumes a SSD logical unit (LUN) should support the TRIM command." As a result, whether the best practice guide rule is recorded as a paper document or as a text file, users of a storage system must personally read the best practice guide, confirm the current status of the system, and take individual action on systems under that person's control. Such an arrangement is subject to error, uses valuable time and labor, and is difficult to update with new rules.

An additional deficiency with the conventional best practices is that electronic devices, such as computers, which interact with other electronic devices, for example storage processors that store and retrieve data for various host computers, work best and most efficiently when both the host computer and the storage processor have compatible software configurations. The best possible input and output (I/O) performance will be found in computers that have well matched configurations.

However, while the configuration data for a computer, such as a storage processor, may be determined by a user of that computer, such as the data storage system administrator, the configuration of host computers may not be known since they may be remote systems that are not commonly owned or operated with the storage processor. The host computers may also use a different best practice guide than that used by the storage processor. Thus, the prior art method of verification of best practices cannot address the issue of matching a computer, such as a storage processor, with the configurations of a set of host computers, all of which may have different best practice guides and software configurations.

An example of matching different configurations, in an electronic device that include SSD, a best practice rule for the device may include support for the TRIM command, which removes unused memory space (i.e., white space) from the memory and increases the amount of available memory space by the amount of removed white space, thus increasing performance. However, if the host computer communicating with the SSD device is not configured to support the TRIM command, the two systems are not as compatible as possible and overall system performance suffers.

In contrast with the conventional best practices, which rely on a person reading a text and determining if the configuration parameter values of a computer match the best practice document, improved techniques for verifying that a storage system complies with best practice rules involve automatically obtaining configuration parameters from the storage array and comparing the configuration parameters with the parameters of a best practice guide file. If the parameters match within specified threshold value, either a message verifying compliance is generated by a verification server, the values of the comparison are recorded in memory, or no action is taken. In an arrangement, a software program operating in a set of host servers obtains host server configuration parameter values and transmits the parameters to the verification server, which compares the host server configuration to the storage system array configuration and to the best practice guide. If the host server configuration parameter values are different than either the current configuration parameter values of the storage system array or the best practice guide configuration, then an alert is generated, and sent by the verification server to a storage system user or manager. In addition, a suggested change notice can be generated and transmitted to the storage system user or manager, and a suggested change notice can also be sent to the host server by the verification server. Best practice rules can be stored in a data base and updated frequently, since they are not text based. With such an arrangement, verification of storage system array configuration is automated and more reliable, and host server configurations are also verified.

In an arrangement, a data storage system including a set of data storage arrays includes a communication interface, a memory and a processing circuit with a controller. The controller operates to automatically verify that the software configuration parameters of the data storage array match a best practice file parameters by obtaining current configuration parameter values from at least one of the data storage arrays and comparing to stored parameter values in a file. If there is a mismatch within a specified threshold value for a parameter value an alert is issued, either to a user, a manager or a maintenance service of the data storage array. If there is a parameter value match, then either no alert is issued, or a verification of compliance notice is issued, or a measure of agreement between the parameter and the file is issued and recorded.

In an arrangement at least one of the host servers that communicate with the set of storage arrays includes software that obtains the host server configuration parameters and sends it to the data storage system for comparing to the stored parameter values and the array parameter values. Obtaining and comparing the parameter values is initiated on a selected schedule, on the occurrence of a selected action, or on the request of a user or operator of the array, or of a user of a host server. The best practices file is stored in a database and may be updated on a regular or irregular basis by new software capabilities, existing software updates, or software patches that are submitted by system experts and reviewed by an approving entity.

In an arrangement a system for automatically verifying software configuration parameters match a best practices file includes a communication interface, a memory and a processing circuit with a controller. The system is constructed and arranged to obtain configuration parameter values from the data storage array and from the host servers, and compare the parameter values to stored parameter values. If there is a mismatch by more than a specified threshold value for a parameter value an alert may be issued.

In an arrangement a computer program product having a non-transitory computer readable medium which stores a set of instructions causing a computerized device to automatically verify that software configuration parameters match a best practices file by obtaining current configuration parameter values from at least one of the data storage arrays and comparing to stored parameter values in a file. If there is a mismatch within a specified threshold value for a parameter value an alert can be issued.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis being placed upon illustrating the principles of various embodiments of the invention.

DETAILED DESCRIPTION

An improved technique is directed to automatically verifying that a storage system comprising an array of storage processors connected to a set of host servers complies with best practices guide and that the host servers configuration parameter values are closely matched to the array of storage processor configuration parameter values as well as to best practice file configuration parameter values. The technique involves a software program, known as a host agent, running in a set of host servers for determining host server configuration parameter values, and transmitting the host server configuration parameter values to a verification server. The verification server is in communication with a user of the array of storage processors, who may be a system manager, a maintenance operator, an electronic device, or other entity having control over the software configuration of the array. The improved technique involves comparing the host server configuration to the storage system array configuration and to the best practice guide file in a database. The database is be updated periodically with authorized changes or additions, and if a best practice rule is found to be different than either, the current configuration of the storage system array, or a current host server configuration, then an alert may be generated, and sent to a storage system user or manager. In addition, a suggested change notices are generated and transmitted to the storage system user or manager, and a suggested change notice is sent to the host server.

Figure 1:
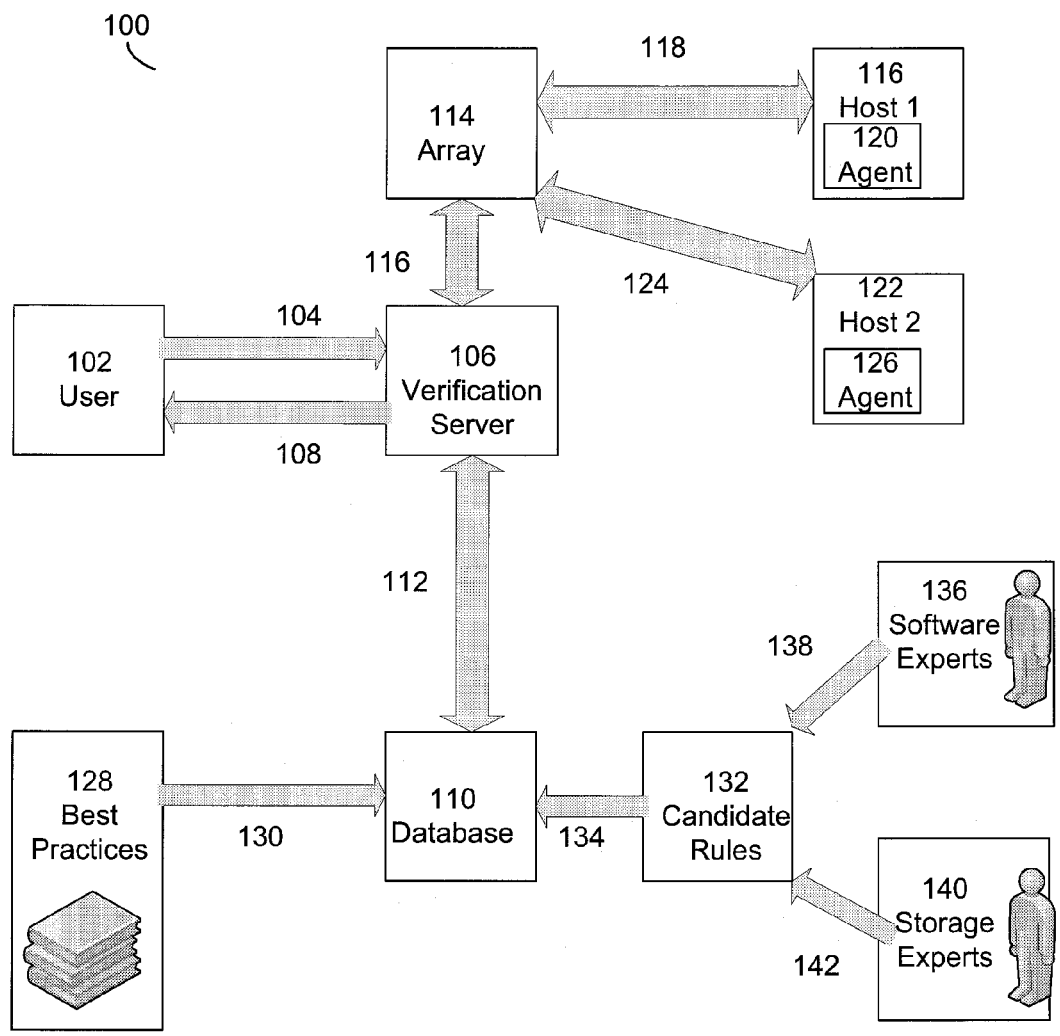
FIG. 1 is a block diagram of components of a computerized system for verifying software configuration parameter values of system components.

FIG. 1 is a block diagram of components of an example computerized system 100 for verifying software configuration parameter values of system components, such as an array 114 of storage processors that communicate with a first host server 116 and a second host server 122. In this arrangement the database 110 stores the best practice guide and the database is in communication with a verification server 106 which operates a software program that performs the verification operation. The verification operation may be initiated by a user 102, or may occur on a regularly scheduled basis, or may occur whenever the database 110 is updated, or when the number or identity of the hosts changes.

During operation the user 102 may send a verification request via bus 104 to verification server 106. The verification server software communicates via bus 116 with at least one member of an array 114 of electronic devices, for example storage processors, and obtains the software configuration parameter values for the electronic device, such as a storage processor. Other methods of initiating a verification operation may include an elapsed time since a prior verification, such as each day at midnight, or a notice from the database 110 that new data has been stored in the best practice guide file.

The configuration parameter values are returned to the verification server 106, which stores them in a memory location. The verification server 106 then accesses the best practice guide file, in this example from database 110 via bus 112, and compares the best practice guide parameter values to the stored array 114 parameter values. If any of the storage processor configuration parameter values differ by more than a selected threshold value from those of the equivalent best practice guide parameter values, for example differing by more than 10% of the best practice guide parameter value, the verification server 106 may issue an alert or notice to the user 102 via bus 108, and may transmit a suggested change in the configuration of the array 114 to the user.

The verification server 106 may further store the results of the verification comparison in a memory location for future review and trend analysis. The presence of a new best practice rule in the best practice guide file would result in a 100% deviation from the array configuration parameter since there would be no equivalent array parameter to compare against.

The operation of verification server 106 may further include comparison of the host servers 116 and 122 that utilize the array 114 to store and recover data via the respective buses 118 and 124. The verification server 106 may transmit software programs to hosts 116 and 112 to act as host agents 120 and 126 respectively. The host agents 120 and 126 may be transmitted to the servers containing hosts 116 and 122 either directly via the buses 118 and 124, or they may be sent by any other form of transmission of software, such as floppy disks, or solid state memory such as flash drives. The host agents 120 and 126 receive a request for current host configuration parameter values, and obtain the selected information from the servers in which the hosts operate.

The host agents 120 and 126 may then transmit the host configuration parameter values to the verification server 106, which stores the values in a memory location and compares the host parameter values to either or both of the stored array parameter values and the best practice guide file parameter values. If any of the host configuration parameter values vary by more than a selected threshold value from the array configuration parameter values, for example by more than 5%, then an alert may be sent to the user 102 and to the affected host server. If any of the host configuration parameter values vary by more than a selected threshold value from the best practice guide file parameter values, for example by more than 10%, then an alert may be sent to the affected host server. The selected threshold values may be different as shown in the example, since the array parameters may vary from the best practice guide parameter values in a different direction as compared to the host server configuration parameter values. Thus, both array and host may be within 10% of the best practice guide configuration parameter values and still may be different from each other by up to 20%, which may cause poor system efficiency and reduced I/O capacity.

The database 110 may be updated at selected times with corrections to configuration parameters, such as patches or improvements to selected portions of software codes, or new software programs. The best practice guide file stored in the database 110 may be formed by formatting and sending 130 an original array 114 paper or word processor best practices document 128, or by new or improved best practice rules or parameter values proposed by software experts 136 or storage experts 140 and transmitted via communication methods 138 and 142 respectively. The software and storage experts may be people or computer systems. Proposed candidate best practice rules or parameter values are reviewed by an approval entity 132, which may be people or computer systems, and if approved are formatted and sent 134 to the database 110 for inclusion in the best practices guide file.

Figure 2:
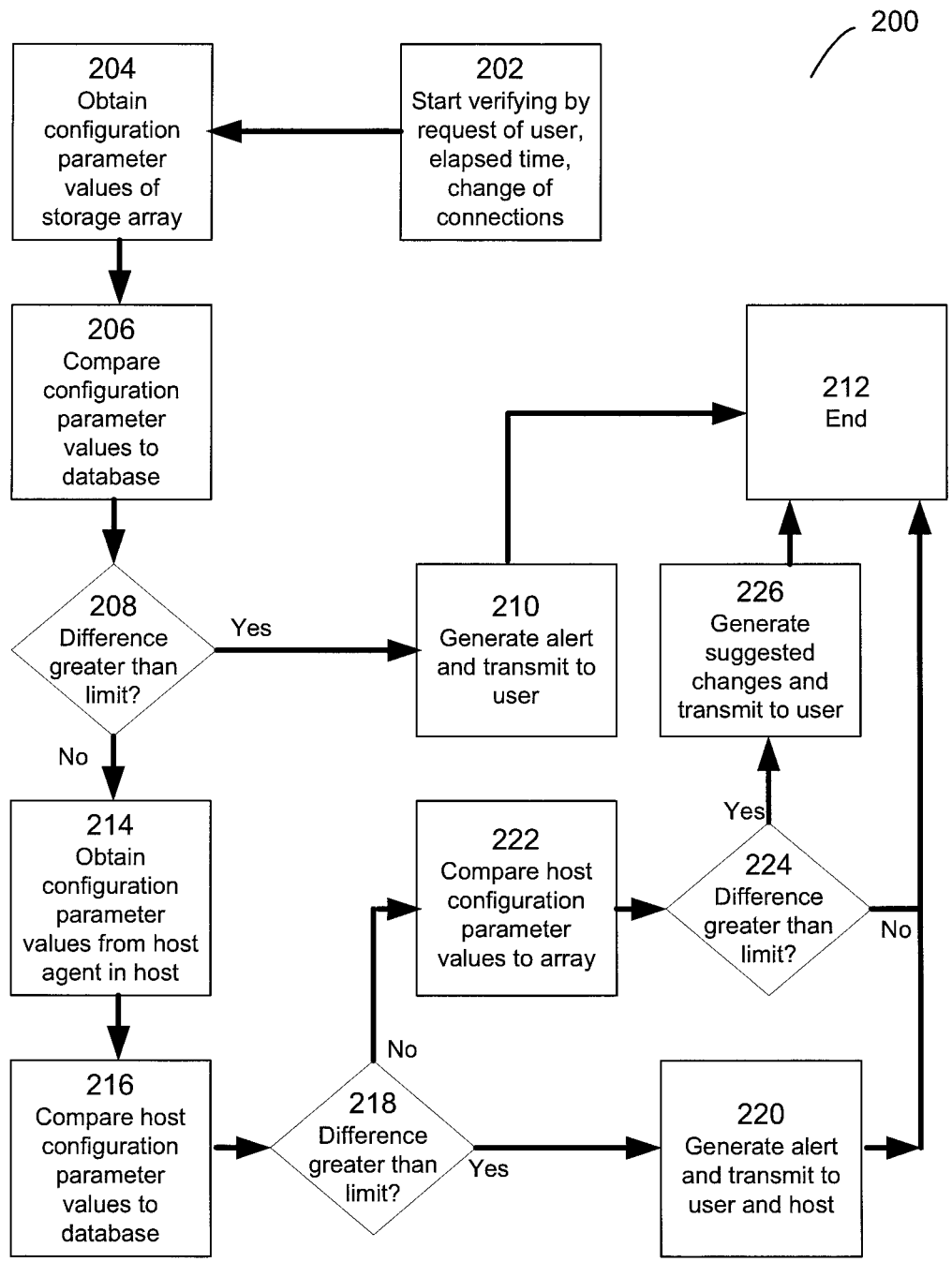
FIG. 2 is a flow chart of a method for verifying software component configuration parameter values.

FIG. 2 is a flow chart of a method 200 for verifying software component configuration parameter values. At step 202 the verification process is initiated in any of a number of easily understood methods, such as by request of a user or system manager, such as the user 102 of FIG. 1. The initiation may be in response to a new host added to the system 100, or an update to the best practice guide file in the data base 110 of FIG. 1, or simply by elapsed time.

At step 204 the method obtains configuration parameter values from the array 114 in response to software operating in verification server 106, and the verification server 106 at step 206 compares the array configuration parameter values to the best practice guide file configuration parameter values in the database 110.

At step 208 the method determines if the differences in the configuration parameter values from the array 114 and database 110 exceeds a selected threshold value, and if the threshold is exceeded the method moves to step 210, and the verification server 106 generates an alert and transmits the alert to the user 102. The method then ends at step 212.

If the threshold is not exceeded, then the method moves to step 214, where the verification server 106 obtains configuration parameter values from host 116 or 122 via the host agents 120 and 126. At step 216 the host configuration parameter values are compared to the database values, and at step 218 it is determined if the threshold has been exceeded or not.

If the threshold has been exceeded, then the method moves to step 220, and an alert is generated and transmitted to at least one of the user 102 or to the affected host 116 or a user of the host 116. If the threshold is not exceeded, then the method moves to step 222 where the verification server 106 compares the host configuration parameter values to the array configuration parameter values.

At step 224 it is determined if the threshold have been exceeded or not. Note that the threshold at step 224 need not be the same threshold value as that used at step 218 or that used at step 208, and each threshold is selected as circumstances indicate.

If the threshold is exceeded the then the method moves to step 226 where the verification server 106 generates suggested changes to the array and/or host configuration parameter values, and the method ends at step 212. If the threshold is not exceeded, then the method ends at step 212.

Figure 3:
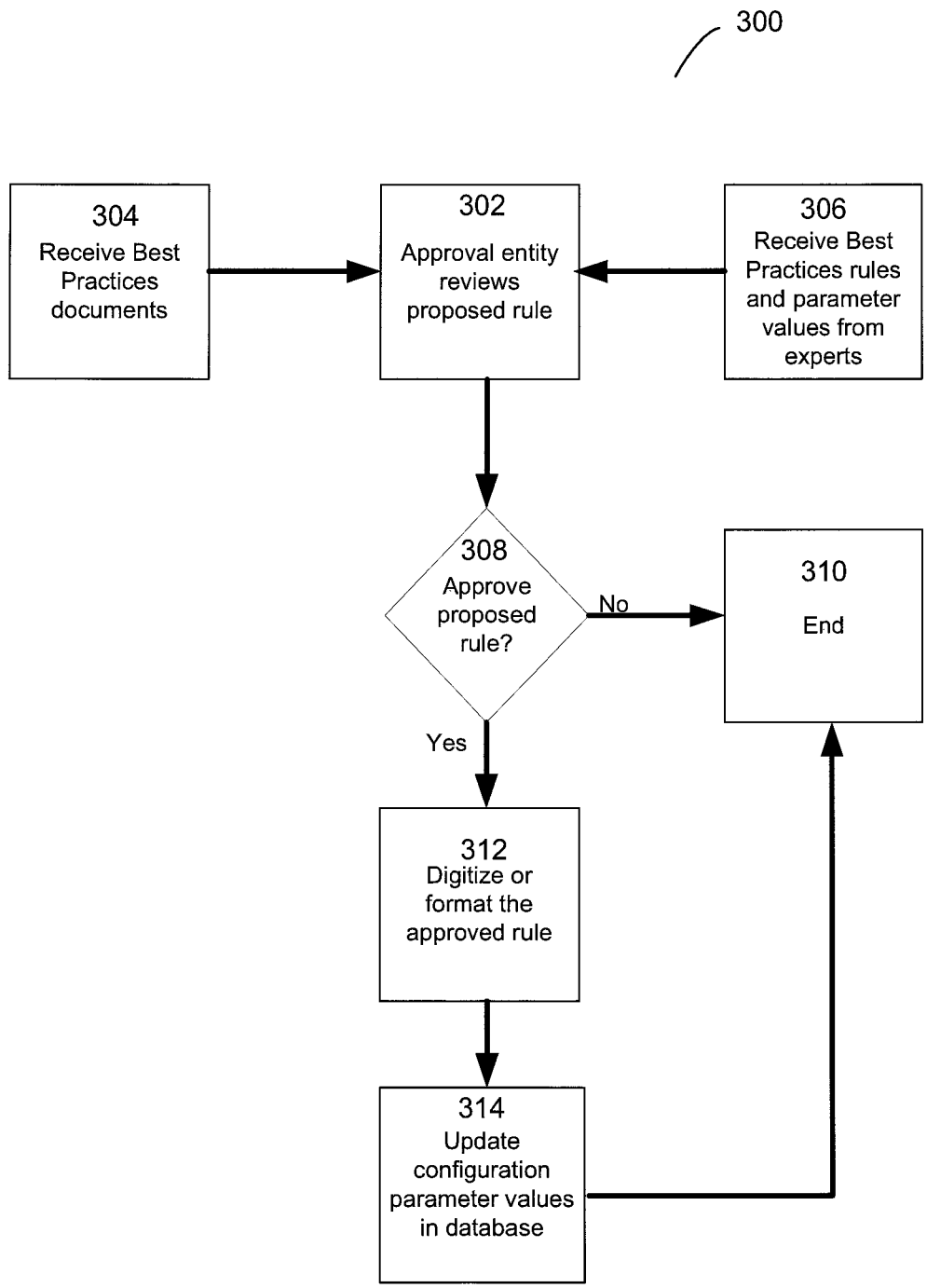
FIG. 3 is a flowchart of a method for updating a best practices configuration file.

FIG. 3 is a flowchart of a method 300 for updating a best practices configuration file. In this illustrative example a best practices document 128 of FIG. 1, is formatted in accordance with the configuration of data base 110, for example as a rule based or structured database format, however, other methods of providing a base best practice guide file may be used.

At step 302 an approval entity, for example an approval board that manages the array 114 and the verification server 106 of FIG. 1, receives the best practice document submitted at step 304 to the approval entity, and proposed best practice rules and parameter values submitted by software and storage system experts submitted at step 306 to the approval entity.

At step 308 the approval entity determines whether or not to approve each proposed best practice rule and parameter value. If the proposed rule is not accepted, then the method ends at step 310. if the proposed rule is accepted then the method moves to step 312 where the approved rule is formatted or digitized to be compatible with the best practice guide file.

At step 314 the best practice guide file is updated to include new rules and parameter values, and to update existing parameter values. The best practice guide file may be stored in the database 110 or in the verification server 106, and the method ends at step 310.

With such an arrangement verifying that computer systems, such as a storage processor, are in compliance with the best practice document is automatically performed and alerts issued. The configuration of host servers in communication with the computer system can also be verified if a host agent software system is installed in the host server, and the configuration match between the host server and the computer system can be measured and corrective action taken automatically. Further, the best practice file can be directly read by the verification server, and updated more easily than printed documents or documents in text format.

As used throughout this document, the words "comprising," "including," and "having" are intended to set forth certain items, steps, elements, or aspects of something in that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the above discussion has used storage processors directly connected by bus communication lines to other storage processors and host servers, however, the storage processors do not need to use bus lines for communication, and wireless, RF, infrared, communication lines may be used. The communications may also use network connections, such as the internet or cloud and need not be directly connected. Furthermore, the arrangements discussed may be used by any electronic device and not limited to storage processors, and any computerized device can use the described arrangement to automatically verify that configuration parameter agrees with the best practice parameters.

The improvements or portions thereof described herein may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

While various embodiments of the invention have been particularly shown and described, it will be understood by those skilled in the art that various changes in form and details may be made therein without departing from the spirit and scope of the invention as defined by the appended claims.

What is claimed is:

1. In a data storage system including a set of data storage arrays, a method for automatically verifying software configurations, the method comprising:
    obtaining configuration parameters of a data storage array of the set of data storage arrays;
    comparing the configuration parameters of the data storage array with values of configuration parameters of a best practices file;
    generating an alert when the configuration parameters of the data storage array differ from the configuration parameter values of the best practices file by more than a specified threshold; and
    not generating an alert when the configuration parameters of the data storage array do not differ from the configuration parameter values of the best practices file by more than the specified threshold;
    wherein the data storage system further includes a set of host servers configured to access data stored in the set of data storage arrays; and
    wherein the method further includes:
        installing at least one host agent software process on at least one of the set of host servers;
        communicating with the at least one host agent software process to obtain a set of host server configuration parameters;
        comparing the host server configuration parameters with the configuration parameter values of the best practices file;
        generating an alert when the configuration parameter values of the host server differ from the configuration parameter values of the best practices file by more than the specified threshold; and
        not generating an alert when the configuration parameter values of the host server do not differ from the configuration parameter values of the best practices file by more than the specified threshold.

2. A method as in claim 1, wherein:
    generating the alert includes transmitting the alert to at least one user; and
    obtaining the configuration of the data storage array of the set of data storage arrays includes receiving at least one of a request from the at least one user for configuration data, expiration of a selected time period since a previous obtaining configuration of the data storage system, and an update of the best practices file.

3. A method as in claim 2 wherein generating the alert when the configuration parameter values of the host server differ from the configuration parameter values of the best practices file further includes transmitting the alert at least one of the set of host servers.

4. A method as in claim 2 wherein:
    transmitting the alert to the at least one user includes transmitting the alert to a user operationally controlling at least one data storage array of the set of data storage arrays;
    storing the best practices file includes:
    storing the best practices file in a database that is communicatively connected to the user; and
    updating the best practices file in the database.

5. A method as in claim 4 wherein further:
    generating an alert includes generating a suggested remedial action when the obtained host server configuration parameters differ from at least one of the best practices file parameters, and the obtained configuration parameters of the data storage array; and
    generating a suggested remedial action for the host server and transmitting the suggested remedial action to at least one of the user and the host server.

6. The method of claim 5 further including:
    updating the best practices file parameter values periodically at a selected interval.

7. A method as in claim 1, wherein the data storage system includes a verification server having processing circuitry and a memory device,
    wherein comparing the host server configuration parameters with the configuration parameter values of the best practices file includes:
        storing, by processing circuitry of the verification server, the host server configuration parameters in the memory device of the verification server;
        retrieving, by the processing circuitry, a best practices configuration parameter value of the best practices file from a storage device in which the best practices file is stored and a host server configuration parameter from the memory device; and
        generating, by the processing circuitry, a difference between the host server configuration parameter and the best practices configuration parameter value, the generated difference indicating whether an alert is generated.

8. A method as in claim 7, wherein generating the alert includes verifying, by the processing circuitry, that a ratio of the difference to the best practices configuration parameter value is greater than the specified threshold.

9. A system for automatically verifying software configurations in a data storage system including a set of data storage arrays, comprising:
    a communication interface;
    a memory;
    a processing circuit, including a controller, coupled to the memory and communication interface, the controller being constructed and arranged to:
        obtain configuration parameters of a data storage array of the set of data storage arrays;
        compare the configuration parameters of the data storage array with values of configuration parameters in a best practices file;
        generate an alert when the configuration parameters of the data storage array differ from the configuration parameter values of the best practices file by more than a specified value; and
        not generate an alert when the configuration parameters of the data storage array do not differ by more than the specified value from the configuration parameter values of the best practices file;

wherein the data storage system further includes a set of host servers configured to access data stored in the set of data storage arrays;

wherein at least one of the set of host servers includes host agent software communicatively connected to the set of data storage arrays by the communication interface and enabled to obtain a set of host server configuration parameters; and wherein the processing circuit is further constructed and arranged to:

communicate with the host agent software to obtain a current a set of host server configuration parameters;

compare the host server configuration parameters with the configuration parameter values of the best practices file;

generate an alert when the configuration parameter values of the host server differ from the configuration parameter values of the best practices file; and not generate an alert when the configuration parameter values of the host server do not differ from the configuration parameter values of the best practices file.

10. A system as in claim 9 further including:

when the configuration parameters of the data storage array differ from the configuration parameter values of the best practices file, transmit, by the communication interface, the alert to at least one user of the data storage system; and when the configuration parameter values of the host server differ from the configuration parameter values of the best practices file, transmit, by the communication interface, the alert to a user of the host server.

11. A system as in claim 10 wherein:

the at least one user of the data storage system includes an entity in operational control of the at least one data storage array of the set of data storage arrays;

wherein the user may include at least one of a storage administrator, a field engineer, and a software developer.

12. A system as in claim 11 wherein:

the best practices file is stored in a database that is communicatively connected to the user;

the best practices file is updated in the database at least one of periodically, at the request of the user, and when storage issues occur;

the alert includes a suggested remedial action when at least one of the data storage array and the host server configuration parameters and differ from at least one of the best practices file parameters; and the suggested remedial action is transmitted to at least one of the user and the host server.

13. The system as in claim 12 wherein further:

the best practices file parameter values are updated periodically at a selected interval.

14. A computer program product having a non-transitory computer readable medium which stores a set of instructions causing a computerized device to perform in a data storage system including a set of data storage arrays, a method for automatically verifying software configurations, the method comprising:

obtaining configuration parameters of a data storage array of the set of data storage arrays;

comparing the configuration parameters of the data storage array with values of configuration parameters of a best practices file;

generating an alert when the configuration parameters of the data storage array differ from the configuration parameter values of the best practices file by more than a specified value; and not generating an alert when the configuration parameters of the data storage array do not differ from the configuration parameter values of the best practices file by more than the specified value;

wherein the data storage system further includes a set of host servers configured to access data stored in the set of data storage arrays; and wherein the method further includes:

installing at least one host agent software process on at least one of the set of host servers;

communicating with the at least one host agent software process to obtain a set of host server configuration parameters;

comparing the host server configuration parameters with the configuration parameter values of the best practices file;

generating an alert when the configuration parameter values of the host server differ from the configuration parameter values of the best practices file; and not generating an alert when the configuration parameter values of the host server do not differ from the configuration parameter values of the best practices file.

15. A computer program product as in claim 14 wherein further:

generating the alert includes transmitting the alert to at least one user; and obtaining the configuration of the data storage array of the set of data storage arrays includes at least one of a request from the at least one user for configuration data, expiration of a selected time period since a previous obtaining configuration of the data storage system, and an update of the best practices file.

16. A computer program product as in claim 15 wherein generating the alert when the configuration parameter values of the host server differ from the configuration parameter values of the best practices file further includes transmitting the alert to the at least one user, and transmitting the alert to the at least one of the set of host servers.

17. A computer program product as in claim 15 wherein:

transmitting the alert to the at least one user includes transmitting the alert to a user operationally controlling at least one data storage array of the set of data storage arrays;

storing the best practices file includes storing in a database that is communicatively connected to the user; and storing the best practices file includes updating the best practices file in the database.

18. A computer program product as in claim 17 wherein further:

generating an alert includes generating a suggested remedial action when the obtained host server configuration parameters differ from at least one of the best practices file parameters, and the obtained configuration parameters of the data storage array; and generating a suggested remedial action for the host server and transmitting the suggested remedial action to at least one of the user and the host server.

19. A computer program product as in claim 18 further including:

updating the best practices file parameter values periodically at a selected interval.

* * * * *